3,373,279
EUROPIUM ACTIVATED STRONTIUM IODIDE SCINTILLATORS
Robert Hofstadter, Stanford, Calif., assignor, by mesne assignments, to Kewanee Oil Company, Bryn Mawr, Pa., a corporation of Delaware
No Drawing. Filed Jan. 29, 1965, Ser. No. 429,141
5 Claims. (Cl. 250—71.5)

ABSTRACT OF THE DISCLOSURE

This invention comprises a scintillation crystal composed of strontium iodide activated by europium. The invention also comprises a radiation detector having a detecting element and a chamber optically coupled to this detecting element, having within the chamber a scintillator consisting of strontium iodide activated with about 10–16,000 parts per million of europium.

---

This invention relates to strontium iodide scintillation crystals. More particularly it relates to substantially optically integral single crystals and polycrystalline masses of strontium iodide doped with europium and which may be grown according to the conventional growing techniques such as the Stockbarger-Bridgman procedure (U.S. Patent 2,149,076) or the Czochralski procedure [Z. Phys. Chem. 92,219 (1918)].

The europium activated strontium iodide crystals of the present invention may be used as scintillators similarly to crystalline-thallium-activated sodium iodide. See Hofstadter, U.S. Patent 2,585,551. The strontium iodide crystals convert a large proportion of the energy from ionizing radiation to light flashes in the region of high spectral sensitivity of photomultiplier tubes and other light detectors. Moreover, the duration and rise of the light pulse (decay time constant) is such that each pulse can be converted by the photomultiplier tube into electrical pulses which may be amplified, and counted or integrated effectively.

The decay time constant of any luminescent material determines its suitability for use as a scintillator. Many phosphors can never be used as scintillators because of a slow decay time constant. That a crystal is "optically integral" presupposes a high degree of transparency of the crystal for its own emitted light. If the crystal or crystalline body is sufficiently transparent then it must additionally be in an "optically integral" form or mass of such character that the light pulses generated anywhere therein from ionizing radiations may be transmitted efficiently to a suitable detector such as a photomultiplier tube or other light sensitive indicator. For the purposes of the present invention, the expression "optically integral" means that there is an optical continuity or optical coupling between parts of the whole body. In bodies with simple geometry, over half of the light originating at any point therein travels a complex path with numerous reflections from the surface of the body or outside reflector. To be most useful as a radiation detector, the efficiencies of the light paths from all points in the body to a window should be nearly equal. The efficiency of the paths ultimately affects the pulse height or signal strength, and the equality of efficiency of the various paths affects the resolution.

That a mass is optically integral is generally apparent to the eye of one experienced in preparing and testing devices with the material in question. It is immediately evident in the pulse height spectrum in that the photopeak from a body which is not optically integral will be broadened or split into several components.

Desirable properties of a scintillator detector device are as follows: the body should be optically integral, have good efficiency of energy conversion, have the desirable geometry of the mass for energy absorption, and have favorable geometry of the mass for light emission reflector surface quality, and window surface quality. There usually should be a reflector surrounding the crystal and it should have a high efficiency of reflection and be uniformly and intimately fitted against the surface of the crystal. The window or light-pipe, which may be nothing more than a portion of the crystal surface not covered by the reflector, should have a good uniform optical coupling with the mass of the crystal and have a good light transmitting efficiency from the crystal to the light detector.

Europium when used in amounts as low as about 10 parts per million causes an emission peak at about 4300±50 angstroms.

The strontium iodide crystals of the present invention containing from about 10 p.p.m. (part per million) to about 16,000 p.p.m. of europium can be used as scintillation crystals.

The discovery that europium activated strontium iodide can be used effectively as a scintillator provides a material which, having a higher stopping power than sodium iodide, may be used in smaller sections to obtain the same stopping power. Being able to use smaller sections is of advantage.

The europium activated strontium iodide scintillators of the present invention are hygroscopic and deteriorate rapidly in humid atmosphere. In order to take advantage of the crystal's scintillation properties, the crystals must be kept in a substantially anhydrous environment. Conveniently, the crystal is "canned" in a hermetically sealed container having an optical window providing for communication of light. The crystal may be coupled optically to the window with an optical fluid, or cement or the crystal may be supported within the container at a suitable vantage point so the scintillation of the crystal may be observed and detected through the window. The container or a part thereof is composed of a radiation permeable material.

As previously mentioned, the scintillation crystals of the present invention are hygroscopic and must be kept at all times in a substantially anhydrous atmosphere. When fabricating, packing, canning or using the instant crystals, it is of advantage to perform all of the operations in an atmosphere having a dew point of −60° C. or less. Moreover, if the crystal is to be used outside of a hermetically sealed container, it is considered within the scope of the invention to house the entire detector or analyzer apparatus in a dry chamber along with the crystal.

Combinations of the crystals of the present invention with photo-multiplier tubes having their own anhydrous chambers or enclosures for the europium activated strontium iodide provide an article of manufacture capable of delivering an electrical signal analogous to that of an equivalent unit containing a crystal of thallium-activated sodium iodide.

The optically integral europium activated strontium iodide crystals of the present invention advantageously may be used with conventional systems designed for counting radiation pulses or in systems designed for measuring integrated radiation intensities. The crystal is optically coupled to a means for converting the fluorescence of the crystal to electrical energy such as a photomultiplier tube or the like. The pulses of light emitted by the scintillator are converted to electrical signals corresponding to the energy of the radiation. In order to measure the pulse height, the integrated electrical signals are selected according to intensity, stored in magnetic or other accumulators and read out by any convenient means such as an oscilloscope or an electric typewriter.

An important feature of the present inention is the formation of the scintillation crystals or bodies under controlled growth conditions. The rate at which these bodies are grown depends on the temperatures of two zones and the flow of heat through the growth interface. The rate of growth and crucible size must be considered in determining the proper conditions necessary for obtaining a body having the desired physical characteristics. These factors are, of course, well known to those skilled in the art and need no further discussion.

Where optical bodies are to be produced, the growth rate is especially important; discontinuities, which accompany casting or fast solidification affect the light transmission characteristics. For best results, the growth rate should be several orders of magnitude slower than the flow of heat would permit. In other words, the amount of heat being conducted through the solidifying mass is many times ($10^3$–$10^5$) the amount of heat given off by the solid being formed due to its latent heat of fusion. In bodies being formed under condition of controlled growth, discontinuities in the materials comprising the solid move toward the heat source at a rate dependent upon vapor pressure of the material and the thermal gradient maintained in the solid.

Before growing the crystal in the furnace, the growth stock must be dehydrated and outgassed. (See Example B infra.) This is conveniently, and preferably carried out under vacuum with a cold-trap or other suitable means of removing water vapor while gradually raising the temperature of the charge as the water content is decreased. If the temperature is raised too rapidly, any water, oxygen, or oxidizing material present will react with the strontium iodide forming alkaline compounds, and the resulting phosphor does not have the necessary properties for use as a scintillator even though it may emit light when exposed for exciting radiation.

In drying and outgassing the material in vacuum, pressures less than 0.001 millimeter Hg absolute are preferred, but pressures up to 0.01 millimeter Hg absolute are tolerable. Atmospheres of the noble gases including argon, helium, and the like, and hydrogen can be used advantageously during subsequent growth by the Czochralski procedure or by the Stockbarger procedure if the growth crucible is not sealed. The inert gas acts to suppress evaporation from the exposed surface.

The following examples are given by way of illustration and not by way of limitation. All parts and percentages are by weight unless otherwise specified.

The following examples set forth a preferred method of preparing strontium iodide which is used as the basic starting material for growing the scintillation crystals of the present invention.

*Example A*

Strontium carbonate, of quality indicated in Table IA, 440 grams, was slurried in one liter of water and to this was slowly added 1670 g. aqueous hydriodic acid (46%) of quality indicated in Table IB. Without further treatment the resultant solution at pH 1.0 was evaporated by boiling until its boiling point reached 140° C. Product was then cooled and finally chilled to 5° C. The strontium iodide hexahydrate crystals (1340 g.) were filtered off and dehydrated under vacuum.

*Example B*

The strontium iodide hexahydrate crystals prepared according to Example A were separated from their mother liquor by a fritted glass Buchner funnel. The hexahydrate crystals were then placed in Vycor ampoules with an open end which was subsequently attached to a vacuum system equipped with a vapor trap cooled with solid $CO_2$ and acetone. Each ampoule was evacuated to a pressure of about 10 microns Hg absolute and pumping continued over a period of at least 24 hours with no heat applied. When the characteristic red color of the mother liquor had faded substantially each ampoule was heated to about 60° C. and held at this temperature until any remaining color had disappeared completely. The ampoules were then in stepwise succession, heated for a second 24-hour period at 90° C., a third 24-hour period at 150° C. and a fourth 24-hour period at 300° C., pumping being continued throughout the entire dehydration. The strontium iodide charge in each ampoule was then substantially free from water of hydration.

The following examples set forth the melting and growing of scintillation crystals according to the present invention.

*Example I*

One of the ampoules containing a charge of strontium iodide and 26 parts per million of europium chloride dehydrated according to Example B, is sealed off while under a vacuum having a pressure of about 0.01 mm. Hg absolute or less. The filled ampoule was then placed in a growing furnace of the Stockbarger type as described in U.S. Patent 2,149,076 wherein the strontium iodide charge was fused and grown into a crystal at a rate of about 1 to 6 mm. per hour. After the charge had been solidified completely forming a crystalline ingot, the furnace and ingot were cooled to room temperature over a period of about 48 hours. The ingot or crystal was removed from the ampoule in a dry box having a substantially anhydrous atmosphere kept at a dew point of about −60° C., cut to size and "canned" in a hermetically sealed container.

*Examples II–VII*

Europium trichloride was added to prepare activated strontium iodide crystals analyzing 250 parts per million europium, 790 parts per million europium, 1,900 parts per million europium, 4,050 parts per million europium, 8,100 parts per million europium, and 15,500 parts per million of europium and scintillation materials according to the invention were thus formed of variable activator concentration.

TABLE IA.—STRONTIUM CARBONATE, CP

| | Percent |
|---|---|
| Alkali salts (as sulfates) | 0.30 |
| Barium | 0.005 |
| Chloride | 0.005 |
| Heavy metals as lead (Pb) | 0.002 |
| Insoluble in acetic acid | 0.010 |
| Iron (Fe) | 0.002 |
| Sulfate ($SO_4$) | 0.005 |

TABLE IB.—HYDROGEN IODIDE

| | Percent |
|---|---|
| As | .005 |
| Cl+Br | .05 |
| Heavy metals as Pb | .001 |
| Fe | .001 |
| Ignition pres. | .005 |
| $SO_4$ | .005 |
| P | .003 |
| Free I | .088 |
| Sp. gravity | 1.51 |
| HI | 46.83 |

A sample of HI acid was obtained having the above approximate analysis shown in Table IB.

Materials which may be employed to prepare the strontium iodide starting material used in growing the scintillation crystals of the present invention include reagent grade strontium carbonate such as sold by Mallinckrodt Chemical Company and 47 percent aqueous solution of hydriodic acid which approximates the typical analysis in columns 3 and 4 of Table II, for reagent purity. The purity specifications of these materials are set forth as follows:

TABLE II

| | Values | Elements Looked For But Not Found | |
|---|---|---|---|
| Aluminum | FT+ | antimony | lithium |
| Boron | VFT+ | arsenic | mercury |
| Cadmium | T+ | barium | molybdenum |
| Calcium | T | beryllium | platinum |
| Chromium | W+ | bismuth | strontium |
| Copper | T+ | cobalt | thallium |
| Iron | W | gallium | tin |
| Lead | VFT | germanium | vanadium |
| Magnesium | T | gold | zinc |
| Manganese | VFT | indium | zirconium |
| Nickel | W | lanthanum | |
| Phosphorus | M- | | |
| Silicon | W | | |
| Silver | VFT+ | | |
| Sodium | T- | | |
| Titanium | FT- | | |

The above specifications for the strontium carbonate, columns 1 and 2 of Table II, and hydriodic acid reactants, columns 3 and 4 of Table II, are given only to impart a general idea of maxima of impurities. Reactants having specifications above the above maximum limits may be used also.

In Table III, I have shown spectrographic impurities in $SrI_2$ as indicated in the legend.

TABLE III.—SPECTROGRAPHIC IMPURITIES IN $SrI_2(Eu)$ SCINTILLATORS APPROXIMATE VALUES

[See legend]

| Ex. No. | Al | Ba | Ca | Cu | Eu | Fe | Pb | Mg | Mn | Si | B |
|---|---|---|---|---|---|---|---|---|---|---|---|
| I | FT | M | T- | EFT+ | T | VFT | EFT- | VFT- | VFT- | VFT | |
| II | VFT+ | W+ | W | EFT | T+ | VFT- | | VFT+ | FT- | VFT | |
| III | FT | W+ | W | EFT+ | W- | VFT- | | FT- | FT | FT- | VFT- |
| IV | FT- | M | T | EFT | M- | VFT | | VFT- | VFT+ | VFT | VFT- |
| V | FT+ | M | T- | EFT | M- | VFT- | VFT | VFT | VFT+ | VFT+ | |
| VI | FT | M | T- | EFT | M | VFT- | | VFT- | VFT+ | VFT+ | |
| VII | VFT+ | M | T- | EFT | M+ | VFT- | | VFT- | VFT+ | VFT+ | |

Approximate Values:
 M=Moderate, .1–1%.
 W=Weak, .01–.1%.
 T=Trace, .001–.01%.
 FT=Faint Trace.
 VFT=Very Faint Trace.
 EFT=Extreme Faint Trace.
 ——— =Not Detected.
In all seven samples: Sr was very strong.
The following were not detected: Sb, As, Be, Bi, Cd, Cr, Co, Ga, Ge, Au, In, La, Li, Hg, Mo, Ni, P, Pt, Ag, Na, Te, Sn, Ti, W, Va, Zn, Zr.

The crystals prepared according to Examples I to VII had pulse heights measurable with the standard photomultiplier tube, relative to a standard thallium-activated sodium iodide containing from about 0.07 to about 0.40 thallium iodide.

The pulse height or integrated light output for each sample was obtained. The results of these tests are shown in following Table IV.

TABLE IV.—RELATIVE RESPONSE FROM CESIUM 137 RADIATION

| Example: | Percent pulse-height relative to NaI(Tl) |
|---|---|
| I | 37 |
| II | 51 |
| III | 57 |
| IV | 79 |
| V | 56 |
| VI | 93 |
| VII | 88.6 |

The specific components used for detection were as follows: a photomultiplier comprising a 3-inch tube having a photocathode with an S–11 cathode spectral response and 10 secondary emitting elements (dynodes) e.g. the RCA 6903; a linear amplifier based on the Argonne A–61 design for use with scintillation crystals; amplifiers, based on this well-known design, accept the negative going pulses of the photomultiplier tube, amplify and invert them to a peak height maximum of 100 volts (one particular model based on this design is the model 30–7 of Radiation Instrument Development Laboratories, Inc.); a multichannel analyzer of the type described in an article by R. W. Schumann et al., Rev. Sci. Instrument, 27, 675 (1956); a transistorized model based on this design is the model 34–12 having 400 channels (sold by the Radiation Instrument Development Laboratories, Inc.); and a capacitor having a resistance of 200,000 ohms of 200K and a capacitance of 40 microfarads.

The type of radiation to be detected or analyzed partly determines the minimum mass needed to stop a significant amount of radiation. Crystals according to this invention have high stopping power and, therefore, can be used in sections thinner than required in the case of NaI(Tl) for equivalent efficiency in stopping radiation.

The hygroscopic strontium iodide may be protected throughout a long useful life by enclosing it in a housing which is air tight. A suitable structure for accomplishing this purpose may be such as shown in U.S. Patent to Carlson, No. 3,068,359, issued on Dec. 11, 1962.

Although specific embodiments of the invention have been shown and described, it will be understood that they are but illustrative and that various modifications may be made therein without departing from the scope and spirit of this invention as defined in the appended claims.

For comparison with calcium iodide, europium activated, strontium iodide, europium activated, gets away from the laminar structure characteristic of the calcium iodide, europium activated. Strontium iodide, europium activated scintillators possess higher stopping power than sodium iodide, thallium activated. Scintillators of the present invention give a choice to the user which can be advantageous. As pointed out above, the decay constant is important. In the case of the scintillators according to the present invention, the decay constant is about 0.44 microsecond.

I claim:

1. A scintillation crystal composed of strontium iodide activated by europium.

2. A scintillation crystal composed of strontium iodide and doped with from about 10 to about 16,000 parts per million of europium.

3. A monocrystalline scintillation crystal of strontium iodide doped with from about 10 to about 16,000 parts per million of europium.

4. The invention as defined in claim 1 further characterized in that the strontium iodide is doped with from about 250 to about 16,000 parts per million of europium.

5. A scintillator comprising a transparent, optically integral crystalline material consisting of strontium iodide activated by from about 250 to about 16,000 parts per million of europium, said material being characterized by having an emission peak at about 4300±50 angstroms and being of sufficient mass to stop a large percentage of ionizing radiations.

References Cited

UNITED STATES PATENTS 3,296,448  1/1967  Swinehart et al. ------ 250—71.5

OTHER REFERENCES

Nuclear Science Abstracts, Abstract No. 14,269, May 15, 1964.

RALPH G. NILSON, *Primary Examiner.*
ARCHIE R. BORCHELT, *Examiner.*
S. ELBAUM, *Assistant Examiner.*